United States Patent
Stav et al.

(10) Patent No.: US 11,274,067 B2
(45) Date of Patent: Mar. 15, 2022

(54) GYPSUM WALLBOARD SLURRY AND METHOD FOR MAKING THE SAME

(71) Applicant: National Gypsum Properties, LLC, Charlotte, NC (US)

(72) Inventors: Eli Stav, Charlotte, NC (US); Gopalakrisnan Sethuraman, Charlottte, NC (US); Ma-Ikay Miatudila, Monroe, NC (US); Karen Fey, Indian Trail, NC (US); Joseph J. Bailey, Charlotte, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 0 days.

(21) Appl. No.: 16/850,467

(22) Filed: Apr. 16, 2020

(65) Prior Publication Data

US 2020/0377422 A1    Dec. 3, 2020

Related U.S. Application Data

(63) Continuation of application No. 14/944,539, filed on Nov. 18, 2015, now Pat. No. 10,662,119, which is a
(Continued)

(51) Int. Cl.
| | | |
|---|---|---|
| *C04B 38/10* | (2006.01) | |
| *C04B 28/14* | (2006.01) | |
| *C04B 111/00* | (2006.01) | |

(52) U.S. Cl.
CPC .............. *C04B 38/10* (2013.01); *C04B 28/14* (2013.01); *C04B 2111/0062* (2013.01)

(58) Field of Classification Search
CPC ......... C04B 38/10; C04B 38/28; C04B 38/14; C04B 2111/0062
See application file for complete search history.

(56) References Cited

U.S. PATENT DOCUMENTS

| 3,057,742 A | 10/1962 | Cunningham et al. |
|---|---|---|
| 4,209,336 A | 6/1980 | Previte |

(Continued)

FOREIGN PATENT DOCUMENTS

| WO | WO9908978 | 2/1999 |
|---|---|---|
| WO | WO2008157479 | 12/2008 |

OTHER PUBLICATIONS

Sherr et al., "Plaster Compositions, Reduction in Water Absorption of Gypsum Plaster with Acrylic Polymers," I & EC Product Research and Development, vol. 8, No. 2, Jun. 2, 1969, pp. 193-196 (Year: 1969).*

(Continued)

*Primary Examiner* — Kara B Boyle
(74) *Attorney, Agent, or Firm* — Dority & Manning, P.A.

(57) ABSTRACT

A slurry for manufacturing gypsum board is disclosed. The slurry comprises calcined gypsum, water, a foaming agent, and a thickening agent. The thickening agent of the present disclosure acts to improve the cohesiveness of the slurry without adversely affecting the setting time of the slurry, the paper-to-core bond (wet and dry), or the head of the slurry by acting as a defoaming agent or coalescing agent. Examples of suitable thickening agents include cellulose ether and co-polymers containing varying degrees of polyacrylamide and acrylic acid. A gypsum board and method of forming the slurry and the gypsum board are also disclosed. The gypsum board comprises a gypsum layer formed from the slurry.

18 Claims, 9 Drawing Sheets

Related U.S. Application Data continuation of application No. 13/403,861, filed on Feb. 23, 2012, now Pat. No. 9,221,719.

(60) Provisional application No. 61/445,977, filed on Feb. 23, 2011.

(56) References Cited

U.S. PATENT DOCUMENTS

| | | |
|---|---|---|
| 5,385,607 A | 1/1995 | Kiesewetter et al. |
| 5,653,797 A | 8/1997 | Patel |
| 5,683,635 A | 11/1997 | Sucech et al. |
| 5,779,786 A | 7/1998 | Patel |
| 6,422,734 B1 | 7/2002 | Sethuraman et al. |
| 6,706,128 B2 | 3/2004 | Sethuraman |
| 6,783,587 B2 | 8/2004 | Sethuraman |
| 6,902,797 B2 | 6/2005 | Pollock et al. |
| 7,294,195 B2 | 11/2007 | Kirkpatrick |
| 8,016,961 B2 | 9/2011 | Martin et al. |
| 2008/0009566 A1 | 1/2008 | Blackburn et al. |
| 2008/0202415 A1 | 8/2008 | Miller et al. |
| 2009/0123727 A1 | 5/2009 | Martin et al. |
| 2009/0169864 A1* | 7/2009 | Wang .................. B32B 13/08 428/319.1 |

OTHER PUBLICATIONS

Data Sheet for Bermocoli E351X from Akzo Nobel (Year: 2019).
International Search Report and Written Opinion for PCT/US12/26391, dated Jun. 20, 2012.
Sherr et al., "Plaster Compositions, Reduction in Water Absorption of Gypsum Plaster with Acrylic Polymers," I & EC Product Research and Development, vol. 8, No. 2, Jun. 2, 1969, pp. 193-196.

* cited by examiner

GYPSUM WALLBOARD SLURRY AND METHOD FOR MAKING THE SAME

CROSS REFERENCE TO RELATED APPLICATIONS

The present application is a continuation of U.S. application Ser. No. 14/944,539 having a filing date of Nov. 18, 2015, which is a continuation of U.S. application Ser. No. 13/403,861 having a filing date of Feb. 23, 2012, which claims the benefit of U.S. Provisional Application No. 61/445,977 having a filing date of Feb. 23, 2011, all of which are hereby incorporated in their entirety.

FIELD OF INVENTION

This disclosure generally relates to slurry formulations for the production of gypsum board. More particularly, this disclosure relates to such slurry formulations that use improved thickening agents.

BACKGROUND

Gypsum board is a composite material made from two cover sheets or facers (Face/Back) with a gypsum layer (i.e., a gypsum core) sandwiched between the sheets. Physical properties of the facers, facer/gypsum core bond, and strength of the gypsum core, all influence physical properties of the gypsum board.

Conventional methods of preparing gypsum wallboard are well known to those skilled in the art. For example, conventional dry ingredients, wet ingredients, and foam can be mixed together to create a fluid mixture or "slurry." The dry ingredients can include, but are not limited to, any combination of calcium sulfate hemihydrate (stucco), glass fiber, and accelerator, retarder, and in some cases natural polymer (i.e., starch). The wet ingredients can be made of many components, including but not limited to, a mixture of water, paper pulp, potash, and polymer (hereinafter, collectively referred to as a "pulp paper solution"). The pulp paper solution provides a significant portion of the water that forms the gypsum slurry of the core composition of the wallboard. The foam is pre-generated and continuously fed to the slurry and homogeneously mixed with the slurry.

The slurry is discharged from the mixer through the mixer's outlet chute or "boot", which spreads the slurry on a moving, continuous top facing material. A moving, continuous bottom facing material is placed on the slurry and the top facing material, so that the slurry is positioned in between the top and bottom facing materials to form the board. The board can then pass through a forming station which forms the wallboard to the desired thickness and width. The board then travels along a belt line for several minutes, during which time the rehydration reaction occurs and the board stiffens (i.e., the stiffening phase). The fluidity of the mix, together with the vibration of the table, will spread the slurry on the top facing material across the board width before the foaming plate. In some cases, the vibration of the table can cause some of the foam air to leave the slurry before it reaches the forming plate.

A conventional gypsum core contains about 60% to 80% air by volume, which depends in part on the components used to form the gypsum core and the amount and structure of foam formed during manufacture of the gypsum core. The gypsum core is formed from a slurry, which is foamed (e.g. air is entrained as the slurry is made by the introduction of foam to the slurry to form air bubbles). As the gypsum core stiffens, the air bubbles are retained in the gypsum core to yield a gypsum core with a plurality of air voids. The size and distribution of the air voids in the gypsum core affects gypsum board strength (e.g. nail pull) and the bonds between the facer material and the gypsum core. The bubbles/air voids can vary in size, shape, and distribution within the gypsum core. The remaining gypsum core between the bubbles/air voids comprises gypsum crystals that form a solid matrix between the bubbles. Typically, the wider the solid matrix between the bubbles/air voids, the stronger the gypsum core. The solid matrix is made from gypsum crystals and to a less extent, starch. In creating the board, it will be appreciated that there is a delicate balance between decreasing weight of the gypsum board while maintaining strength of the gypsum board.

The fluidity of the stucco slurry coming from the mixer can strongly affect the quality of gypsum board. The stiffening and setting time of the slurry should be properly adjusted to keep the slurry fluid enough to spread over the facing material and hard enough to cut at the knife. Stiffening is the change in mix fluidity caused by the hydration reaction. The fluidity of the slurry can be controlled by the amount of dispersant and water added to the slurry and to some extent by controlling the set time. The fluidity of the slurry can be increased by increasing the water to stucco ratio and/or amount of dispersant added to the slurry and vice versa, the fluidity of the slurry can be decreased by decreasing the water to stucco ratio and amount of dispersant used.

While the use of very fluid slurries can be advantageous in certain situations (i.e., with high speed production lines), it can cause some accumulation of bubbles at the top of the gypsum core below the back facing material. Such accumulation can adversely affect the paper-to-core bond and result in high soap usage to maintain the volume of the slurry (the volume of the slurry is known as "head"). Also a very fluid mix can result in air entrainment known in the industry as "core voids". In contrast to the bubbles that are imparted on the slurry by the foam, core voids are large air pockets (several millimeters in size) that form in the slurry when the slurry has too high of a fluidity. As the slurry is deposited on and spreads over the facing material, the slurry can capture ambient air to form such core voids. Core voids weaken the resulting board and can lead to defective board being produced. These drawbacks can be even more pronounced when unstable foam is used to create larger and more discrete bubbles in the core.

In order to overcome the drawbacks of a slurry with high fluidity, the cohesiveness of the slurry can be increased with the addition of thickening agents. For example, pre-gelled starch can thicken the slurry and increase the slurry cohesiveness. Thickening is increasing mix cohesiveness by adding a thickening material. However, use of pre-gelled starch in this manner results in defoaming which requires manufactures to increase the amount of foaming agent used. Other thickening agents have a slow thickening action and do not work quickly enough to be used in this process.

As such, there remains an opportunity to provide improved slurries, methods of making such slurries, and methods of using such slurries to manufacture improved gypsum boards. Such slurries can be improved by identifying and using a thickener in a manner that improves the cohesiveness of the board and allows proper coalescing to form larger and more discrete air voids in the gypsum layer. As used throughout this disclosure, the terms "air bubble" or "bubble" is used to refer to the bubbles imparted on the slurry by the foam and "air void" or "void" are the terms used to refer to the resulting voids that form from such bubbles in the gypsum core of the finished board. Such use of the terms of "air void" or "void" shall not encompass the defects known as core voids. As used in this disclosure, the terms "air bubble/bubble" and "air void/void" encompasses a bubble, a cavity, pocket, or a void. Further, it will be appreciated that the terms bubble and void can be used interchangeably when discussing the characteristics and size of the bubbles/voids. The use of such thickener should not adversely affect the setting time of the slurry, the paper-to-core bond (wet and dry), or the head of the slurry by acting as a defoaming agent.

DESCRIPTION OF THE DRAWINGS

The features and advantages of the present disclosure, and the manner of attaining them, will be more apparent and better understood by reference to the following descriptions taken in conjunction with the accompanying figures, wherein.

DETAILED DESCRIPTION

Figure 1:
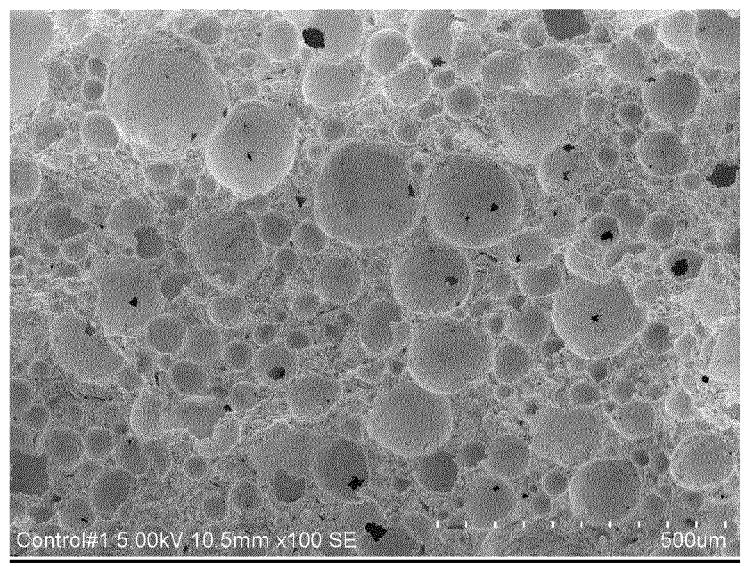
FIG. 1 is a scanning electron microscope (SEM) photograph of a cross-section of the control board for Example 1 formed with a stable foam and illustrates a gypsum layer having a plurality of voids.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The disclosure of the present application provides various slurries, gypsum boards formed from the various slurries, and methods of making the slurry and the gypsum board. The slurry can be used to form the gypsum board, more specifically, to form a gypsum layer of the gypsum board. The gypsum board may also be referred to as drywall, plasterboard, gypsum wallboard, wallboard, and other similar terms. It will be appreciated that the gypsum board is not limited to any particular use, i.e., the gypsum board may be used for walls, ceilings, floors, tile-bases, soffits, and other similar uses.

According to at least one embodiment of a slurry of the present disclosure, stucco slurry can comprise calcined gypsum, water, a foam, a thickener, and any number of suitable additives known in the art. Stucco slurry is not limited to any particular type of calcined gypsum. The calcined gypsum may also be referred to in the art as calcium sulfate hemihydrate ($CaSO_4 \cdot \frac{1}{2}H_2O$), stucco or plaster of Paris. Examples of suitable calcined gypsum as well as sources, methods, and reactions for obtaining the calcined gypsum, are described in: U.S. Pat. No. 8,016,961 to Martin et al.; U.S. Pat. No. 6,706,128 to Sethuraman; U.S. Pat. No. 6,422,734 to Sethuraman et al.; and U.S. Pat. No. 6,783,587 to Sethuraman et al.; hereinafter referred to as the incorporated references, the disclosures of which are incorporated herein by reference in their entirety; so long as, the incorporated disclosure does not conflict with the general scope of the present disclosure.

In embodiments of the calcined gypsum of the present disclosure, the calcined gypsum is capable of reacting with water, thereby forming a reaction product comprising dihydrous calcium sulfate and typically, residual water. The reaction between the calcined gypsum and water is shown generally below:

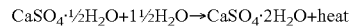

$CaSO_4 \cdot \frac{1}{2}H_2O + 1\frac{1}{2}H_2O \rightarrow CaSO_4 \cdot 2H_2O + heat$ In this reaction, the calcined gypsum is rehydrated to its dihydrate state ($CaSO_4 \cdot 2H_2O$) over a fairly short period of time. The actual time required for the reaction generally depends upon the type of calciner employed and the type of gypsum rock that is used to form the calcined gypsum. The reaction time may be controlled to a certain extent by the use of additives such as accelerators and retarders, which are described in more detail below. During the reaction, the slurry will generally transition from a fluid state to a hard or "set" state as the hydration reaction product forms/sets (the "setting time").

The calcined gypsum can be used in various amounts. Typically, the slurry is manufactured and manipulated such that a gypsum layer formed therefrom, i.e., the reaction product, will have a conventional thickness, such as a thickness less than 1 inch, more typically a thickness of from about ¼ to about ⅝ inch. The amount of calcined gypsum that is present in the slurry will depend on the desired thickness. For example, when a ½ inch thick board is desired, the slurry will typically contain calcined gypsum in an amount from between about 337 to about 1180 lbs/msf, alternatively about 548 to about 970 lbs/msf, alternatively from about 674 to about 843 lbs/msf. It will be appreciated that 1 msf refers to 1,000 square feet. As understood in the art, the amounts of calcined gypsum given in msf can be applied to and adjusted for various thicknesses of the gypsum layer formed from the slurry. For example, for a ⅝ inch thick board, the weight of stucco is from about 1785 lbs/msf to about 2040 lbs/msf. General dimensions and manufacturing methods of gypsum boards are also understood in the art and are described further below.

Typically, the water and the calcined gypsum are reacted in a weight ratio of from about 0.5 to about 1.5, alternatively from about 0.75 to about 1.25, and alternatively from about 0.80 to about 1.0. Generally, it is desirable to provide enough water for the calcined gypsum to react with and to make the slurry liquid enough to spread over the facing material and to fill the volume required to make the board.

The foaming agent may be any foaming agent understood in the art, including, but not limited to, the foaming agents described in the incorporated references. The foaming agent typically comprises an aqueous solution of soaps/surfactants and it might contain also a solvent such as ethanol, alcohol, water, or a combination thereof. Typically, the foaming agent comprises an anionic surfactant; however, it is to be appreciated that other types of surfactants can also be used, such as cationic surfactants, nonionic surfactants, etc. The surfactant solution typically comprises 30% to 60% of the active foaming agent. The foaming agent can be used to generate foam by a number of conventional foam generating methods.

It will be appreciated that any number of foaming agents can be used in the slurry with or without a coalescing agent. In certain embodiments, the foaming agent comprises an unstable foaming agent, such as Agent NB8515, which is an alkylesulfate compound made by Stepan Company of Northfield, Ill. Other foaming agents from Stepan Company can also be used (i.e., Cedepal® FA-406 or Alpha Foamer®) with or without a coalescing agent, as well as foaming agents from other companies such as Thatcher TF, which is commercially available from Thatcher Chemical Company, Salt Lake City, Utah and Hyonic® PFM, e.g. PFM 30, which is commercially available from Geo Specialty Chemicals of Lafayette, Ind. All of these soaps can be used with or without a coalescing agent.

The foaming agent can be used in various amounts. Typically, the foaming agent is present in the slurry in an amount of from about 0.1 to about 2.0 lbs/msf, alternatively from about 0.4 to about 1.25 lbs/msf, and alternatively from about 0.5 to about 0.9 lbs/msf. It is to be appreciated that the foaming agent can comprise a combination of two or more of the aforementioned surfactants. In certain embodiments, the slurry includes one foaming agent. In other embodiments, the slurry includes two or more different foaming agents with or without coalescing agents.

The foaming agent may be in various forms, such as liquid, flake, or powdered form. The foaming agent is useful to generate foam that imparts a plurality of bubbles in the slurry during formation of the reaction product, as understood in the art. By imparting, it is generally meant that the foam brings bubbles into the slurry and/or forms bubbles in the slurry during formation. Generally, the foaming agent itself is frothed such that it includes bubbles before addition to form the slurry. Frothing can occur simply by mixing through mechanical agitation the foaming agent, water, and air. The pre-generated foam can be added along with the calcined gypsum and water and/or after the calcined gypsum and water are combined.

A thickening agent of the present disclosure acts to improve the cohesiveness of the slurry and does not adversely affect the setting time of the slurry, the paper-to-core bond (wet and dry), or the head of the slurry by acting as a defoaming agent or coalescing agent. Example of suitable thickening agents include cellulose ether and co-polymers containing varying degrees of polyacrylamide and acrylic acid.

As used herein, cellulose ethers are cellulose derivatives that may be obtained by reacting cellulose with an alkyl halide or ethylene oxide and its derivatives. Examples of cellulose ethers include, but are not limited to, methyl celluloses, ethyl celluloses; such as, hydroxyl ethyl cellulose and ethyl hydroxyl ethyl cellulose, propyl celluloses; such as, hydroxyl propyl cellulose and hydroxypropyl methyl cellulose.

According to at least one embodiment of the present disclosure, the cellulose ether is a non-ionic, water soluble, unmodified ethyl hydroxyl ethyl cellulose. The anhydroglucose unit is the fundamental repeating structure of cellulose and has three reactive hydroxyl groups. The number of hydroxyl groups which react is expressed as the degree of substitution ("DS"). The DS value, which falls between 0.5 and 1.0 for water-soluble cellulose ethers, designates the average number of hydroxyl positions on the anhydroglucose unit that has been etherified. The molar degree of substitution (MS) is the average number of bonded hydroxyalkyl groups per anhydroglucose unit. Further, the ethyl hydroxyl ethyl cellulose may have a variety of viscosity grades, including between about 3500 to about 6500 mPas (2% solution, Brookfield LV spindle #3 at 12 rpm). Alternately, it may have a viscosity grade of between about 4250 to about 6000 mPas (2% solution, Brookfield LV spindle #3 at 12 rpm).

An example of such an ethyl hydroxyl ethyl cellulose is Bermocoll 351X, which is commercially available from Akzo Nobel N.V., Amsterdam, The Netherlands. It is a non-ionic, water soluble cellulose ether at medium viscosity grade between 4250 to 6000 mPas (2% solution, Brookfield LV spindle #3 at 12 rpm). It is a fine powder grade and its particle size is ninety-eight percent less than 300 microns. Further, it has a DS value of about 0.9 and MS value of about 1.9, where the hydroxyl groups have been etherified by substituting with ethoxy (using ethylene chloride) and hydroxylethoxy (using ethylene oxide) moieties. Another example is Tylose® MH 60000 P6 which is an unmodified methyl hydroxyethyl cellulose commercially available from S. E. Tylose GMBH & Co., Wiesbaden, Germany. The reported viscosity of this cellulose ether is 28000-34000 mPas (2% solution, Brookfield RV spindle at 20 rpm).

The cellulose ether can be used in various amounts. Typically, the levels of cellulose ether present in the slurry is in an amount from about 0.02 to about 1.0 lbs/msf. Alternately, the cellulose ether may be present in the slurry in an amount of about 0.05 to about 0.8 lbs/msf, or about 0.1 to about 0.5 lbs/msf. Additionally, in at least one exemplary embodiment, the thickening agent may include a secondary thickening agent, such as a pre-gelled starch, clay or other conventional thickeners known in the art. Such a secondary thickening agent may be present at a level of between 0.0 and 5.0 lbs/msf. Alternatively, the secondary thickening agent may be present in an amount of about 1 to about 5 lbs/msf, or about 3 to about 5 lbs/msf.

Suitable co-polymers of polyacrylamide are ones in solution with up to about 40% of acrylic acid. Where a solution is provided without acrylic acid, a homo-polymer of acrylamide is used as the thickening agent. The molecular weight of such co-polymers can range between about 100,000 to 1,000,000 Daltons. It is preferred that a solution co-polymer of polyacrylamide with 10% acrylic acid be used. An example of such a co-polymer is the Superfloc P-26, which is commercially available from Kemira Group, Helsinki, Finland. In such a solution, the active polymer comprise about 19% to about 20% of the solution, has a pH between 4.2 and 5.5, has a bulk viscosity of 12000 cps and a dilute viscosity of 180 cps.

Co-polymers of polyacrylamide can be used in various amounts. Typically, the levels of co-polymers of polyacrylamide present in the slurry is in an amount from about 0.005 to about 0.05 lbs/msf. Alternately, the co-polymer of polyacrylamide may be present in the slurry in an amount of about 0.01 to about 0.05 lbs/msf (based on the active of the thickening agent in solution). The amounts are based on the active ingredient of a solution containing the co-polymers of polyacrylamide. Additionally, in at least one exemplary embodiment, the co-polymer agent may include a secondary thickening agent, such as a pre-gelled starch, clay or other conventional thickeners known in the art. Such a secondary thickening agent may be present at a level of between 0.0 and 5.0 lbs/msf. Alternatively, the secondary thickening agent may be present in an amount of about 1 to about 5 lbs/msf, or about 3 to about 5 lbs/msf.

Preferred thickening agents of this disclosure serve to promote thickening of the slurry immediately from introduction of the thickening agent (the "thickening effect") without having a strong defoaming effect. For example, it is thought ethyl hydroxyl ethyl cellulose does not have a defoaming effect because it has a minimal effect on surface tension. Whereas the surface tension of water is 72 Dynes/cm, that of a 2% solution of an ethyl hydroxyl ethyl cellulose, like Bermocoll E351X, is around the mid-60's Dynes/cm, similar to the surface tension of the foam slurry.

The slurry can also include a number of other additives understood in the art. Examples of suitable additives include, but are not limited to, those described in the incorporated references, as well as starches, accelerators, fibers (such as paper and/or glass fibers), polymers, potash, clay, boric acid, plasticizers, fire retarders, mildew retarders, thickeners, dispersants, or a combination thereof. The additive component can be used in various amounts and can include one or more of the aforementioned additives. Specific amounts of certain additives can be appreciated with reference to the Examples section below. It is to be appreciated that the additives can be used in amounts greater or less than those amounts specifically illustrated therein.

Further, as is taught by U.S. Pat. No. 8,016,961 to Martin et al. ("Martin"), embodiments of the slurry can include a coalescing agent to coalesce the plurality of small air bubbles imparted by the foam to create larger and more discrete bubbles. In addition to the coalescing agents disclosed in Martin, it can be desired to utilize coalescing agents that have a delayed coalescing action. In other words, coalescing action by the coalescing agent is delayed for a period of time while the coalescing agent is in the slurry along with bubbles formed by the foam. The period of time may be less than the time it takes for the slurry to have initial stiffening such that the coalescing agent can act.

Such coalescing agents can be selected based on the temperature at which the coalescing agent begins to fall or precipitate out of solution (the "cloud point"). Preferred coalescing agents have a cloud point ($T_{CP}$) so that it is between the initial mix temperature ($T_1$) and the peak mix temperature ($T_2$) of the slurry/reaction product. As such, the coalescing agent coalesces the plurality of bubbles in the slurry after the temperature of the slurry reaches the cloud point ($T_{CP}$) of the coalescing agent. This point is not necessarily exact, as the cloud point ($T_{CP}$) may vary, but a period of time does typically pass before coalescing of the bubbles begins which were imparted by the foaming agent. It is believed that coalescing action of the coalescing agent generally increases as the temperature of the slurry/reaction product surpasses the cloud point ($T_{CP}$).

The reaction between the calcined gypsum and water is exothermic. As such, the slurry typically has a significant rise in temperature from the initial temperature ($T_1$) to the peak temperature ($T_2$) after mixing, i.e., once the reaction product starts forming. The change in temperature may be 15 to 25° C. or more from the initial temperature ($T_1$) to the peak temperature ($T_2$). By selecting a suitable coalescing agent having a cloud point ($T_{CP}$) within this range ($T_1$, $T_2$), bubble formation and coalescing can be controlled in the slurry, and therefore, the reaction product. It is also possible that the temperature of the slurry is controlled in such a way that the coalescing agent can be activated or deactivated based on the cloud point ($T_{CP}$) being passed or not.

It will be appreciated that any number of coalescing agents can be used in the slurry. In certain embodiments, the coalescing agent comprises a block copolymer surfactant such as ES8915 which is commercially available from BASF Corporation of Florham Park, N.J. The coalescing agent may also be referred to in the art as a nonionic surfactant.

The coalescing agent can be used in various amounts. Typically, the coalescing agent is present in the slurry in an amount of from about 0.01 to about 1.0 lbs per 1000 square feet (msf), alternatively from about 0.05 to about 0.5 lbs/msf, and alternatively from about 0.10 to about 0.25 lbs/msf. The foaming agent and the coalescing agent are typically present in the slurry in a weight ratio of from about 10:0.05 to about 5:1.5, alternatively from about 7.5:1 to about 5:1, alternatively from about 7:1 to about 6:1.

The slurry can be formed by conventional methods understood in the art. Examples of such methods, and apparatuses for forming the slurry, are described in the incorporated references. Typically, the slurry is formed using a mixer and a conveyor. The components of the slurry are provided and added to the mixer. The mixer typically has one or more feeds, such as a feed for dry components, e.g. the calcined gypsum, and one or more feeds for wet components, e.g. the water and the foam. The components are mixed in the mixer to form the foam slurry. Each of the components can be added to the mixer in various combinations. The coalescing agent may be added through any of the water sources (i.e., foam water, gauging water or pulp water), directly to the mixer, directly to the foam generator, or to the slurry discharge (i.e., the "boot") depending on the production requirements. If included, the additive component(s) can be added in a similar fashion. The slurry is typically fed to a conveyor having a facing material or cover sheet disposed thereon. A forming plate skims the foamed slurry such that the reaction product is of a certain thickness.

As described above, once the calcined gypsum and water come into contact, they generally begin reacting to form the reaction product. The foam imparts a plurality of bubbles in the slurry. The thickening agent upon inclusion begins to promote thickening of the slurry immediately or shortly after inclusion and in at least some embodiments prior to the slurry contacting the forming plate. The slurry is typically conveyed through the forming plate, as understood in the art.

Typically, a second facing material and/or cover sheet is applied to the gypsum layer to form the gypsum board; however, it is to be appreciated that the gypsum board may also include just one cover sheet and the gypsum layer. The cover sheet(s) can be folded to encapsulate edges of the gypsum layer. As understood in the art, the gypsum layer is typically sandwiched between the cover sheets. The cover sheets can be formed from various materials understood in the art, such as from paper or glass fiber. The cover sheets may be the same as or different than each other, and may be referred to as Face and Back sheets. Examples of suitable cover sheets, for purposes of the present disclosure, are described in the incorporated references. As understood in the art, certain types of cover sheets may have additives or make-ups which impart desirable fire or mildew retarding properties.

Heat can be applied to the gypsum board to remove residual water from the gypsum layer. Methods of removing residual water are understood in the art, such as by employing dryers or drying chambers. As understood in the art, certain dispersants/plasticizers may be used to reduce the amount of water, hence reducing the eventual drying time/energy needed to produce the gypsum board.

The gypsum board can eventually be cut into various lengths. Typically, dimensions of the gypsum boards include a width of about 48 inches (~120 cm) to about 54 inches (~137 cm), and a thickness of from ¼ inch (~6 mm) to about 1 inch (~25 mm), alternatively about ½ inch (~13 mm) to about ⅝ inch (~16 mm), and alternatively from about ¼ inch to about and ⅜ inch (~10 mm). The gypsum board may be made with different edges, for example, with two different edge treatments: a tapered edge, where the long edges of the board are tapered with a wide bevel at the front to allow for jointing materials to be finished flush with the main board face; and a plain edge, used where the whole surface will receive a thin coating (skim coat) of finishing plaster. It is to be appreciated that the present disclosure is not limited to any particular dimension or configuration of the gypsum board.

The gypsum board can have various physical properties. Typically, the gypsum board has reduced weight relative to conventional gypsum boards of the same general dimensions, due to the voids defined therein. It is believed that the gypsum boards also have strengths approaching or even surpassing the strengths of conventional gypsum boards of the same general dimensions.

The weight of the gypsum board produced from these types of slurries will be dependent on how thick the board is. For example, a ½ inch thick gypsum board typically has a weight of less than about 1500 lbs/msf, alternatively from about 1200 to 1400 lbs/msf, and alternatively from about 1200 to 1350 lbs/msf. The gypsum board shall also have sufficient strength and paper-to-core bond strength to meet the requirements set forth in ASTM C1396 for wallboard. It will be appreciated that such characteristics are measured by a variety of different measurements, including, but not limited to, nail pull strength, humidified deflection, compressive strength, and humidified paper core bond integrity.

It will be appreciated that many changes can be made to the following examples, while still obtaining a like or similar result. Accordingly, the following examples, illustrating embodiments of the slurries and gypsum boards, are intended to illustrate and not to limit the invention.

EXAMPLES

Examples of slurries and gypsum boards are formed using conventional methods understood in the art. As illustrated in the Figures and the below tables, the gypsum layers and boards of the present disclosure improve the cohesiveness of the board without adversely affecting the setting time of the slurry, the paper-to-core bond (wet and dry), or the head of the slurry by acting as a defoaming agent.

Example 1

Table I below provides an example of a slurry formulation that can be used that includes cellulose ether and the improvements in the produced board over a control wallboard that does not contain cellulose ether.

TABLE I

| Wet End Properties for Example 1 | | |
|---|---|---|
| Sample | Control | Example 1 |
| SoapType | Stepan 8515 | Stepan 8515 |
| Stucco Weight (lbs/msf) | 1156 | 1192 |
| Soap (lbs/msf) | 0.55 | 0.57 |
| Dispersant (lbs/msf) | 7.0 | 7.0 |
| Acid Modified Starch (lbs/msf) | 20 | 20 |
| Bermocoll 351X (lbs/msf) | — | 0.36 |
| Accelerator (lbs/msf) | 6.5 | 6.5 |
| Liquid Retarder (lbs/msf) | 0.06 | 0.06 |
| Water/Stucco Ratio | 0.76 | 0.78 |
| ¼# min:sec | 02:40 | 02:25 |
| Slump (inches) | 9.0 | 7.0 |
| Board Weight (lbs/msf) | 1450 | 1493 |
| NP (lbs) | 77 | 81 |
| 20 Hr Peel (%) Face | 0 | 0 |
| 20 Hr Peel (%) Back | 0 | 0 |

All board samples were ½ inch thick.

As illustrated in Table I, soap usage did not change much between the Control and Example 1. However, the slump was reduced from 9.0" to 7.0" resulting in a more cohesive slurry in the sample that included cellulose ether (Bermocoll 351X). This demonstrates that the cellulose ether did not have a strong defoaming effect. It also shows that the cellulose ether did not affect the setting time of the mix. It should be noted that the term "soap" is equivalent to a foaming agent.

In this embodiment, cellulose ether is a ethyl hydroxyl ethyl cellulose, commercially available from AkzoNobel Corporation. The cellulose ether acts as a thickener and helps control the slurry fluidity. It is dry fed to the mixer.

Accelerator is a ball mill accelerator and it is dry fed to the mixer.

Regular starch is acid modified corn starch and it is dry fed to the mixer. The water comprises pulp water, gauging water and foam water wherein the pulp water can be about 180 lbs/msf, the foam water can range from about 175 lbs/msf to about 525 lbs/msf, and the gauging water can range from about 220 lbs/msf to about 660 lbs/msf.

Figure 2:
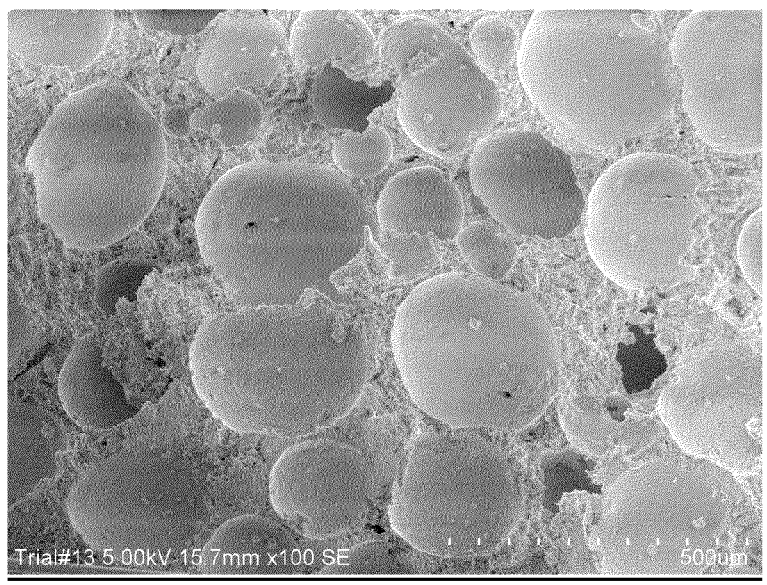
FIG. 2 is a SEM photograph of a cross-section of a board of Example 1 of the present disclosure formed with unstable foam and cellulose ether and illustrates a gypsum layer having a plurality of voids that are larger and more discrete.

Additional benefits can be appreciated with reference to Table II and FIGS. 1 and 2. Using the similar formulation as set forth in Table I, the board weight was dropped to between about 1300 lbs/msf and 1360 lbs/msf. The Example 1 board sample was produced from a slurry with cellulose ether and an unstable soap, which comprised Agent NB8515 in this embodiment. In contrast to Table I, the control board was produced using a stable soap, which comprised Thatcher TF in this embodiment. As shown below, the sample with the cellulose ether had a higher nail pull strength while having stronger humidified bond values; despite having a lower board weight.

TABLE II

| Sample | Bd wt (lbs/msf) | Nail Pull (LbF) | Humidified Bond % Failure | | | |
|---|---|---|---|---|---|---|
| | | | 2 hr | | 20 hr | |
| | | | Face | Back | Face | Back |
| Control (stable soap, no cellulose ether) | 1550 | 75 | 85 | 55 | 70 | 55 |
| Example 1 (unstable soap, cellulose ether) | 1357 | 78 | 10 | 22 | 11 | 9 |

Additional benefits can be appreciated with reference to FIGS. 1 and 2, which each respectively show a SEM photograph of a cross section of the Control board sample of Table II and a SEM photograph of a cross section of the Example 1 board sample of Table II. Referring to FIGS. 1 and 2, it can be seen that the addition of the cellulose ether with unstable soap in Example 1 (shown in FIG. 2) also facilitates the formation of larger air voids in the resulting board (~100 to 350 microns) versus the air voids in the control board with stable soap (~20 to 250 microns), as shown in FIG. 1. As discussed above, larger air voids are desired to increase the strength of board while permitting the board weights to be further reduced.

Example 2

Table III below provides another example of a slurry formulation that can be used that includes cellulose ether and demonstrates the improvements in the produced board over two different control wallboard samples that do not contain cellulose ether.

TABLE III

Wet End Properties for Example 2 and Resulting Properties

| Component (lbs/msf) | Control 1 | Control 2 | Example 2 |
|---|---|---|---|
| Calcined Gypsum (dry) | 1168 | 1048 | 1042 |
| Foaming Agent | 0.7 | 1.02 | 1.0 |
| Coalescing Agent | 0.0 | 0.0 | 0.15 |
| Potash | 3.2 | 1.5 | 0.75 |
| Accelerator | 9.0 | 9.5 | 8.4 |
| Fiberglass | 1.0 | 1.0 | 1.0 |
| Regular Starch - acid modified corn starch | 8.0 | 9.0 | 9.0 |
| Starch - pregelled | 0.0 | 0.0 | 5.0 |
| Retarder | 0.1 | 0.1 | 0.1 |
| Cellulose Ether | 0.0 | 0.0 | 0.5 |
| Boric Acid | 0.0 | 0.0 | 0.5 |
| Water/Calcined Gypsum Ratio | 0.86 | 0.88 | 0.93 |
| Board Weight (lbs/msf) | 1490 | 1344 | 1340 |
| Nail Pull (lbs/msf) | 84 | 65 | 81 |
| 20 Hr Humidified Bond (Face/Back) | 1%/3% | 10%/95% | 0%/1% |
| Humidified Deflection (inches) | — | 0.07 | 0.08 |

All board samples were ½ inch thick.

The coalescing agent is an EO/PO reverse block copolymer, having a cloud point ($T_{CP}$) of from about 16.0 to about 60.0° C. according to ASTM D2024 and an ethylene oxide (EO) weight percent of from about 10 to about 50 based on 100 parts by weight of the reverse EO/PO block copolymer, commercially available from BASF Corporation.

Accelerator is a ball mill accelerator and it is dry fed to the mixer.

Cellulose ether is ethyl hydroxyethyl cellulose, commercially available from AkzoNobel Corporation. The cellulose ether acts as a thickener and helps control the slurry fluidity. It is dry fed to the mix.

The acid modified corn starch is dry fed to the mixer.

The water comprises pulp water, gauging water and foam water wherein the pulp water can be about 180 lbs/msf, the foam water can range from about 175 lbs/msf to about 525 lbs/msf, and the gauging water can range from about 220 lbs/msf to about 660 lbs/msf.

The control board was produced using a stable soap, which comprised Thatcher TF in this embodiment. The Example 2 with cellulose ether and a coalescing agent used a stable soap, which comprised Cedepal® FA-406 in this embodiment.

Figure 3:
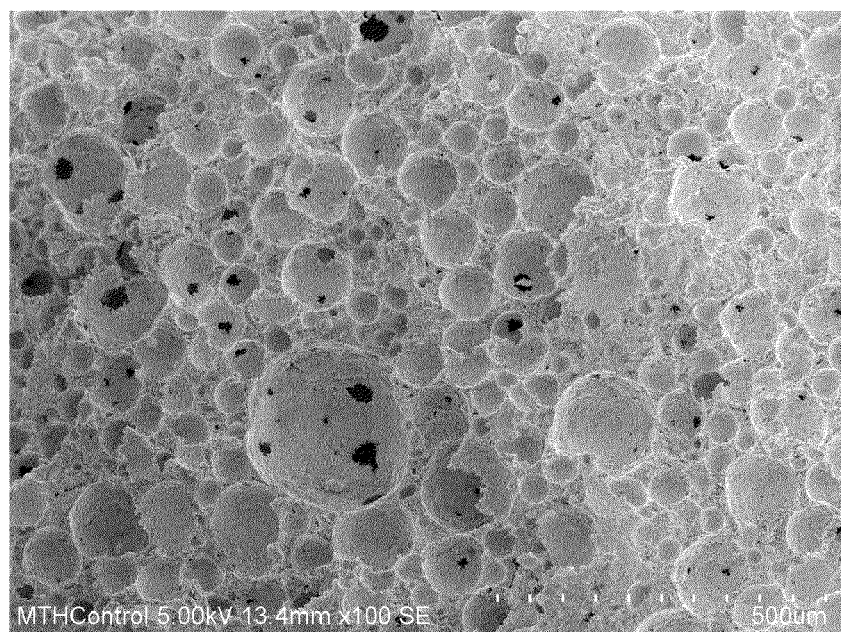
FIG. 3 is a SEM photograph of a cross-section of a second control board for Example 2 and illustrates a gypsum layer having a plurality of voids.
Figure 4:
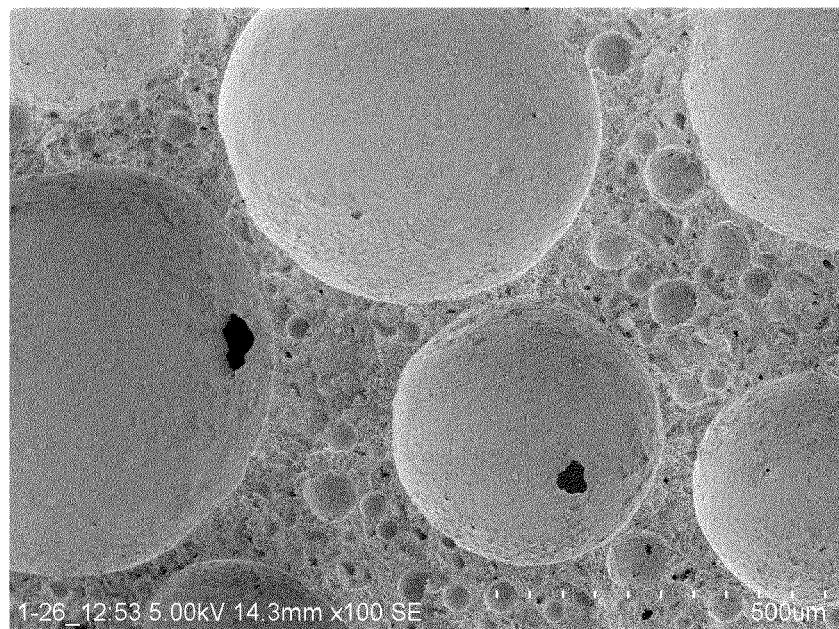
FIG. 4 is a SEM photograph of a cross-section of a board of Example 2 of this disclosure formed with cellulose ether and a coalescing agent and illustrates a gypsum layer having a plurality of voids that are larger and more discrete.

Additional benefits can be appreciated with reference to FIGS. 3 and 4, which each respectively show a SEM photograph of a cross section of the Control 2 board sample and a SEM photograph of a cross section of the Example 2 board sample. For example, difference in the air void size between Control 2 (~50 to 300 microns), shown in FIG. 3, and the Example 2 (~400 to 800 microns), shown in FIG. 4, can be better appreciated. Example 2 is considered to have excellent void/bubble structure and physical properties. As discussed above, larger and more discrete air voids are desired to increase the strength of the board while allowing the board weight to be decreased.

It is believed that these physical properties are imparted by the use of the coalescing agent with the cellulose ether; especially, when the coalescing action is delayed such that it begins after a period of time has passed, such as once the slurry is on the conveyor and/or at the forming plate. It is to be appreciated that the coalescing action may start at any time after the slurry is formed and before the reaction product sets. It is also to be appreciated that two or more different coalescing agents may be employed such that two or more coalescing actions and respective periods of time can be employed.

Additional benefits of the use of the cellulose ether can be appreciated with reference to this Table IV. Using similar formulations as set forth in Table III for Example 2 with adjustments being made for the manufacturing plant producing the board, a board with the coalescing agent and cellulose ether was compared to a board with the coalescing agent and no cellulose ether. As shown in Table IV, the sample with the cellulose ether had higher nail pull strength and greater cohesiveness as shown by the lower slump measurement.

TABLE IV

| Sample | Bd wt (lbs/msf) | Nail Pull (Lbf) | Slump (inches) | Core Voids Present? | 2 Hr Humidified Bond % Failure Face | 2 Hr Humidified Bond % Failure Back |
|---|---|---|---|---|---|---|
| Sample 1 (with cellulose ether) | 1488 | 89 | 7.5 | No | 0 | 0 |
| Sample 2 (without cellulose ether) | 1422 | 78 | 8.5 | Yes | 0 | 0 |

As noted in Table IV, the sample with the cellulose ether prevents the formation of core voids in the slurry. In contrast to the bubbles that are imparted on the slurry by the foam, core voids are large air pockets (several millimeters in size) that form in the slurry when the slurry has too high of a fluidity. As the slurry is deposited on and spreads over the facing material, the slurry can capture ambient air to form such core voids. Core voids weaken the resulting board and can lead to defective board being produced. As such, care needs to be exercised in preventing the formation of such core voids by ensuring the slurry has a sufficient amount of cohesiveness. As shown in Table IV, the samples with cellular ether prevent the formation of such core voids.

Example 3

Table V provides another example of a slurry formulation that can be used that includes cellulose ether and demonstrates the improvements in the produced board over different control wallboard samples that do not contain cellulose ether.

TABLE V

| Wet End Properties for Example 3 | | | | |
|---|---|---|---|---|
| Component | Control 1 | Control 2 | Control 3 | Example 3 |
| Soap Type | Thatcher TF | 8515 | 8515 | 8515 |
| Stucco (lbs/msf) | 1269 | 1255 | 1147 | 1184 |
| Soap (lbs/msf) | 0.64 | 0.503 | 0.55 | 0.57 |
| Dispersant (lbs/msf) | 7.0 | 7.0 | 7.0 | 7.0 |
| Acid Modified Starch (lbs/msf) | 15.0 | 15 | 20 | 20 |
| Cellulose Ether (lbs/msf) | — | — | — | 0.36 |
| Accelerator (lbs/msf) | 6.5 | 6.5 | 6.5 | 6.5 |
| Retarder (lbs/msf) | 0.06 | 0.06 | 0.06 | 0.06 |
| Water/Stucco Ratio | 0.78 | 0.76 | 0.76 | 0.78 |
| Foam Weight (lbs/ft$^3$) | 7.0 | 4.7 | 4.7 | 4.7 |
| ¼# min:sec | 02:20 | 02:40 | 02:40 | 02:25 |
| Slump (inches) | 7 | 9.0 | 9.0 | 7.0 |
| Board Weight (lbs/msf) | 1593 | 1564 | 1450 | 1493 |
| NP (lbs) | 88 | 88 | 77 | 81 |
| 2 Hr Peel (%) Face | 100 | 2 | 30 | 8 |
| 2 Hr Peel (%) Back | 100 | 6 | 18 | 20 |
| 20 Hr Peel (%) Face | 18 | 0 | 0 | 0 |
| 20 Hr Peel (%) Back | 12 | 0 | 0 | 0 |

All board samples were ½ inch thick.

As illustrated in Table V, the control samples differed in the type of soap used. The Control 1 sample used the previously discussed stable soap Thatcher TF and the Control 2 and Control 3 samples used the previously discussed unstable soap AgentNB8515. The Example 3 sample also used the same unstable soap in combination with cellulose ether. As shown in Table V, Control 3 and Example 3 are the closest boards in weight, in starch usage and in soap usage. While the soap usage did not change much between Control 3 and Example 3, the slump was reduced from 9.0" to 7.0" resulting in a more cohesive slurry in the sample that included cellulose ether (Bermocoll 351X). This demonstrates that the cellulose ether did not have a strong defoaming effect. It also shows that the cellulose ether did not affect the setting time of the mix.

In this embodiment, cellulose ether is a ethyl hydroxyl ethyl cellulose, commercially available from AkzoNobel Corporation. The cellulose ether acts as a thickener and helps control the slurry fluidity. It is dry fed to the mixer.

Accelerator is a ball mill accelerator and it is dry fed to the mixer.

Regular starch is acid modified corn starch and it is dry fed to the mixer. The water comprises pulp water, gauging water and foam water wherein the pulp water can be about 245 lbs/msf, the foam water can range from about 60 lbs/msf to about 240 lbs/msf, and the gauging water can range from about 290 lbs/msf to about 885 lbs/msf.

Figure 5:
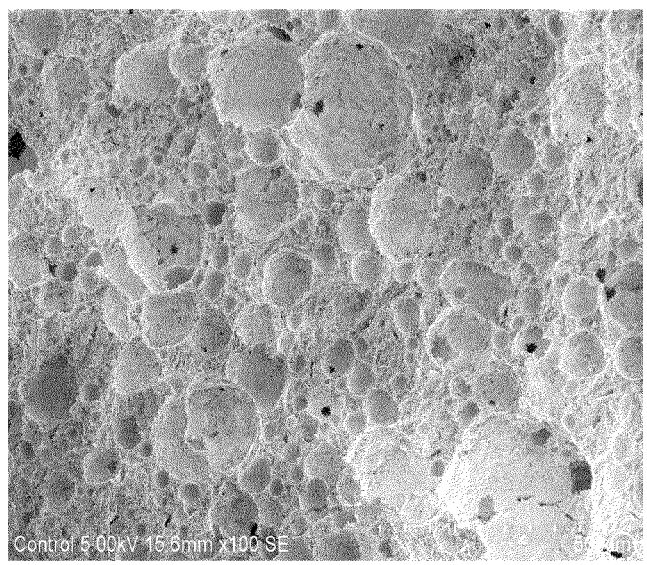
FIG. 5 is a SEM photograph of a cross-section of a first control board for Example 3 formed from a slurry with a stable soap and illustrates a gypsum layer having a plurality of air voids.
Figure 6:
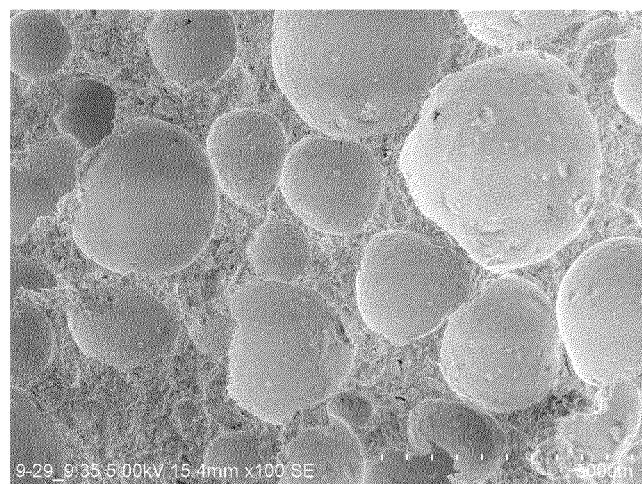
FIG. 6 is a SEM photograph of a cross-section of a second control board for Example 3 formed from a slurry with an unstable soap and illustrates a gypsum layer having a plurality of air voids.
Figure 7:
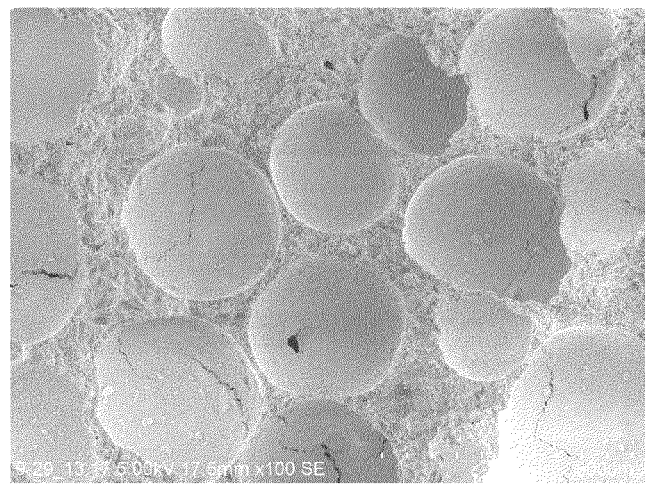
FIG. 7 is a SEM photograph of a cross-section of the Example 3 board formed from a slurry with an unstable soap and cellulose ether and illustrates a gypsum layer having a plurality of air voids.

Additional benefits can be appreciated with reference to Table VI and FIGS. 5-7. As shown below, the Example 3 formulation with the cellulose ether had a higher nail pull strength while having stronger humidified bond values than the control sample 3 that has a similar weight.

TABLE VI

| Wallboard Sample | BW lbs/msf | Nail Pull (Avg.) | HB 2 Hr % Failure | | HB 20 Hr % Failure | |
|---|---|---|---|---|---|---|
| | | | Face | Back | Face | Back |
| Control 1 | 1571 | 88 | 100% | 100% | 16% | 12% |
| Control 2 | 1565 | 88 | 2% | 6% | 0% | 0% |
| Control 3 | 1450 | 77 | 30% | 18% | 0% | 0% |
| Example 3 | 1493 | 81 | 8% | 20% | 0% | 0% |

Moreover, in comparing FIGS. 5, 6 and 7 to one another, it can be seen how the combination of the unstable soap and cellulose ether creates a larger more discrete air bubble in the slurry/air voids in the gypsum core. FIG. 5 shows a SEM photograph of a cross-section of the Control 1 board sample that utilizes a stable foam. As shown in FIG. 5, the air voids range in a variety of sizes (~50 to 300 microns) with most of the air voids being on the smaller side. FIG. 6 shows a SEM photograph of a cross-section of the Control 2 board sample. As shown in FIG. 6, the unstable foam causes the air voids to coalesce so that they are larger and more discrete than those in the Control 1 board sample but the air voids still range substantially in size. FIG. 7 shows a SEM photograph of a cross-section of the Example 3 board sample. As shown in FIG. 7, the air voids are larger and more discrete than those in the Control 1 board sample and are more homogenous and uniform in size than those contained in the Control 2 board sample. It is thought that it is these large, discrete and more uniform sized air voids that lead to higher strength levels in lighter weight wallboard. While this comparison is made in relation to the use of unstable foam, it should be noted, as discussed above, that a similar phenomenon is witnessed when a coalescing agent is used in association with the cellulose ether.

Example 4

As discussed in this disclosure, a solution co-polymer of polyacrylamide can be used as the thickening agent in lieu of cellulose ether to achieve similar results. Table VII below provides another example of a slurry formulation that can be used that includes a solution co-polymer of polyacrylamide with 10% acrylic acid. Table VII demonstrates the improvements in the produced board with the thickening agent of Example 4 over a control wallboard sample containing no thickening agent (Control 1) and compares Example 4 to a control wallboard sample that contains cellulose ether (Control 2).

TABLE VII

| Wet End Properties for Example 4 and Resulting Properties | | | |
|---|---|---|---|
| Component (lbs/msf) | Control 1 | Control 2 | Example 4 |
| Calcined Gypsum (dry) | 1070 | 1068 | 1070 |
| Total Water | 1030 | 1030 | 1030 |
| Foaming Agent | 0.81 | 0.83 | 0.85 |
| Coalescing Agent | 0.064 | 0.067 | 0.068 |
| Accelerator | 9.2 | 9.5 | 9.5 |
| Fiberglass | 1.0 | 1.0 | 1.0 |
| Regular Starch - acid modified | 9.0 | 9.0 | 9.0 |

TABLE VII-continued

Wet End Properties for Example 4 and Resulting Properties

| Component (lbs/msf) | Control 1 | Control 2 | Example 4 |
|---|---|---|---|
| corn starch | | | |
| Starch - Pregelled | 4.0 | 4.0 | 4.0 |
| Sugar (Dextrose) | 1.25 | 1.25 | 1.25 |
| Cellulose Ether (Bermocoll 351X) | 0.0 | 0.5 | 0 |
| Solution Co-polymer (Superfloc P-26) | 0.0 | 0.0 | 0.012 |
| Boric Acid | 0.5 | 0.5 | 0.5 |
| Board Weight (lbs/msf) | 1370 | 1368 | 1369 |
| Nail Pull (LbF) | Not measured | 83 | 82 |
| Slump | 10 | 9.5 | 9.0 |

All board samples were ½ inch thick.

In the Control 2 board sample, cellulose ether is a ethyl hydroxyl ethyl cellulose (Bermocoll 351X), commercially available from AkzoNobel Corporation. The cellulose ether acts as a thickener and helps control the slurry fluidity. It is dry fed to the mixer.

In this embodiment, the Example 4 sample utilizes a solution co-polymer of polyacrylamide with 10% acrylic acid (Superfloc P-26), commercially available from Kemira Group. Just as the cellulose ether, the solution of polyacrylamide with 10% acrylic acid acts as a thickener and helps control the slurry fluidity. It is fed to the mixer in solution.

In each sample, the accelerator is a ball mill accelerator and it is dry fed to the mixer. The regular starch is acid modified corn starch and it is dry fed to the mixer. The water comprises pulp water, gauging water and foam water wherein the pulp water can be about 245 lbs/msf, the foam water can range from about 60 lbs/msf to about 240 lbs/msf, and the gauging water can range from about 290 lbs/msf to about 885 lbs/msf. The board samples were produced using a stable soap, which comprised Cedepal® FA-406.

As shown in Table VII, the slump was reduced from 10.0" in the Control 1 board sample to 9.0" in the Example 4 board sample, which was a greater reduction than what is seen between the Control 1 board sample and the Control 2 board sample with cellulose ether (10" to 9.5"). As previously discussed, such reduction in slump results in a more cohesive slurry in both the Example 4 board sample that included the co-polymer of polyacrylamide with 10% sodium acrylate (Superfloc P-26) and Control 2 board sample that included cellulose ether (Bermocoll 351X). This demonstrates that both of these thickening agents did not have a strong defoaming effect. It also shows that these thickening agents did not affect the setting time of the mix.

Figure 8:
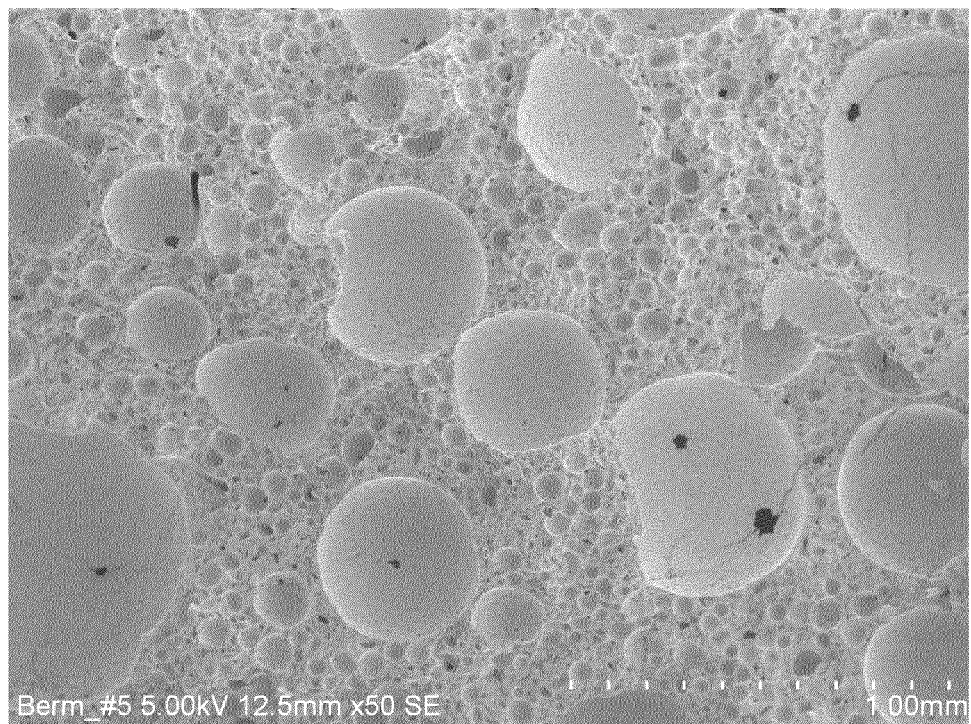
FIG. 8 is a SEM photograph of a cross-section of a control board of Example 4 of the present disclosure formed with cellulose ether and a coalescing agent and illustrates a gypsum layer having a plurality of voids that are larger and more discrete.
Figure 9:
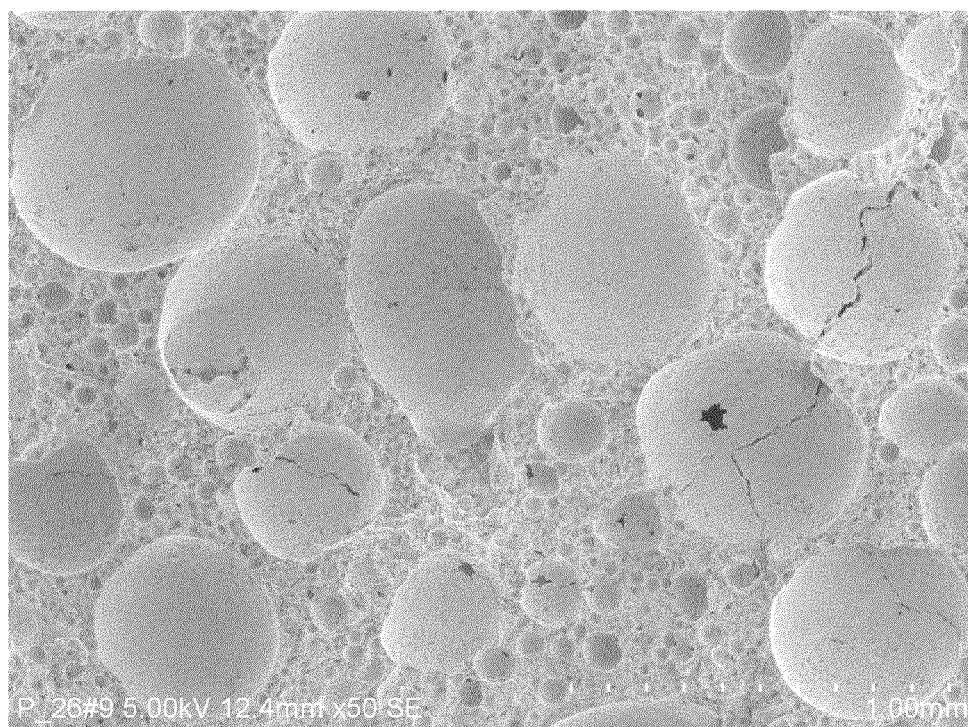
FIG. 9 is a SEM photograph of a cross-section of a board of Example 4 of the present disclosure formed with co-polymer polyacrylamide and acrylic acid and illustrates a gypsum layer having a plurality of voids that are similar in size to the board depicted in FIG. 8.

Further similarities between cellulose ether or the solution co-polymer of polyacrylamide with 10% acrylic acid can be appreciated with reference to FIGS. 8 and 9, which each respectively show a SEM photograph of a cross section of the Control 2 board sample of Table VII and a SEM photograph of a cross section of the Example 4 board sample of Table VII. Referring to FIGS. 8 and 9, it can be seen that the addition of the solution co-polymer of polyacrylamide with 10% acrylic acid in Example 4 (shown in FIG. 9) also facilitates the formation of larger air voids in the resulting board (~100 to 350 microns) similar to the air voids in the Control 2 board sample with cellulose ether (~100 to 350 microns), as shown in FIG. 8. As discussed above, larger air voids are desired to increase the strength of board while permitting the board weights to be further reduced. Evidence of the strength of the resulting boards using one of the disclosed thickening agents can be seen in Table VII where Control 2 board sample and Example 4 board sample had nail pull strength in excess of 80 pounds of force.

While various embodiments of the compositions of the present disclosure have been described in considerable detail herein, the embodiments are merely offered by way of non-limiting examples of the disclosure described herein. It will therefore be understood that various changes and modifications may be made, and equivalents may be substituted for elements thereof, without departing from the scope of the appended claims. Indeed, this disclosure is not intended to be exhaustive or to limit the scope of the appended claims.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the appended claims. In addition, claims directed to a method and/or process should not be limited to the performance of their steps in the order written. Such sequences may be varied and still remain within the scope of the appended claims.

What is claimed is:

1. A gypsum board comprising:
    a gypsum layer formed from a gypsum slurry having a composition comprising
    calcined gypsum;
    water;
    an aqueous foam; and
    a first thickening agent comprising a polyacrylamide;
    wherein the calcined gypsum is present in the gypsum slurry in an amount of from 1785 to 2040 lbs/msf and wherein the gypsum board has a thickness of ⅝".

2. The gypsum board of claim 1, wherein the first thickening agent comprises a copolymer of polyacrylamide.

3. The gypsum board of claim 2, wherein the copolymer includes up to about 40% of acrylic acid.

4. The gypsum board of claim 2, wherein the copolymer is present in the gypsum slurry in an amount of from −0.005 to 0.05 lbs/msf.

5. The gypsum board of claim 1, wherein the polyacrylamide is a homopolymer.

6. The gypsum board of claim 1, wherein the polyacrylamide has a molecular weight of from about 100,000 Daltons to about 1,000,000 Daltons.

7. The gypsum board of claim 1, further comprising a second thickening agent.

8. The gypsum board of claim 7, wherein the second thickening agent comprises a pre-gelled starch or clay.

9. The gypsum board of claim 1, wherein the aqueous foam comprises an alkylsulfate compound, water, and air.

10. The gypsum board of claim 1, further comprising a coalescing agent.

11. The gypsum board of claim 10, wherein the coalescing agent comprises an EO/PO reverse block copolymer.

12. The gypsum board of claim 10, wherein the coalescing agent has a cloud point between an initial temperature of the gypsum slurry and a peak temperature of the gypsum slurry during hydration of the calcined gypsum.

13. The gypsum board of claim 12, wherein the initial temperature is from about 18.0 to about 37.0° C. and the peak temperature is from about 37.0 to about 70.0° C. during hydration of the calcined gypsum.

14. The gypsum board of claim 10, wherein the coalescing agent is present in an amount of from about 0.02 to about 1.0 lbs per 1000 square feet of the gypsum board.

15. The gypsum board of claim 10, wherein the aqueous foam comprises a foaming agent and wherein the foaming agent and the coalescing agent are present in a weight ratio of from about 10:0.05 to about 5:1.5.

16. The gypsum board of claim 10, wherein the aqueous foam comprises a foaming agent and wherein the foaming agent and the coalescing agent are present in a weight ratio of from about 7.5:1 to about 5:1.

17. A method of forming the gypsum board of claim 1, the method comprising:
  combining the calcined gypsum and the water to form a slurry,
  initiating thickening of the gypsum slurry upon introduction of the first thickening agent comprising a polyacrylamide to the slurry,
  imparting a plurality of bubbles in the slurry by adding foam generated from the aqueous foam wherein the aqueous foam comprises a foaming agent;
  forming dihydrous calcium sulfate in a hydration reaction of the calcined gypsum to form a set gypsum board.

18. The gypsum board of claim 1, wherein the aqueous foam comprises a foaming agent including a stable foaming agent and an unstable foaming agent.

\* \* \* \* \*